United States Patent [19]

Lucht

[11] Patent Number: 4,726,346
[45] Date of Patent: Feb. 23, 1988

[54] DEVICE TO PREVENT DIESEL FUEL FROM GELLING

[76] Inventor: James P. Lucht, 834 Hidden Hills Dr., Bellevue, Nebr. 68005

[21] Appl. No.: 28,740

[22] Filed: Mar. 23, 1987

[51] Int. Cl.⁴ .............................................. F02M 31/16
[52] U.S. Cl. ..................................... 123/557; 123/549; 123/142.5 R
[58] Field of Search ............... 123/557, 549, 546, 553, 123/554, 142.5 R; 126/366, 367, 368

[56] References Cited

U.S. PATENT DOCUMENTS

| | | | |
|---|---|---|---|
| 822,382 | 6/1906 | Murphy | 126/366 |
| 2,259,545 | 10/1941 | Black | 219/316 |
| 3,280,298 | 10/1966 | Klancke et al. | 123/142.5 R |
| 4,237,850 | 12/1980 | Connor et al. | 123/557 |
| 4,600,825 | 7/1986 | Blazejovsky | 219/205 |
| 4,656,979 | 4/1987 | Hogenson | 123/142.5 R |

FOREIGN PATENT DOCUMENTS 0055461 7/1982 Fed. Rep. of Germany ...... 123/557

Primary Examiner—Ira S. Lazarus
Assistant Examiner—M. Macy
Attorney, Agent, or Firm—Zarley, McKee, Thomte, Voorhees & Sease

[57] ABSTRACT

A device for heating the fuel in a diesel fuel tank is described comprising a collar having a tubular member extending downwardly therefrom and thence laterally therefrom. The tubular member may either be connected to the water manifold of the truck so that hot water is passed therethrough or may have an electric heating element mounted therein. The device is installed on the tank by simply securing the collar to the filler neck of the tank and then closing the upper end of the collar with a cap.

7 Claims, 9 Drawing Figures 4,726,346

DEVICE TO PREVENT DIESEL FUEL FROM GELLING

BACKGROUND OF THE INVENTION

Diesel fuel, when subjected to cold temperatures, frequently gels in the fuel tank of a truck thereby interfering with the normal operation of the truck. In U.S. Pat. No. 4,237,850, a system is provided to heat the diesel fuel in the fuel tank thereby preventing the same from gelling. However, in U.S. Pat. No. 4,237,850, an access opening must be created in the tank to install the system. When the system has been installed in the access opening, the mounting plate supporting the system must be secured to the tank by screws or the like. It is a time-consuming and costly operation to cut an access opening in the fuel tank and to mount the system of the '850 patent in the fuel tank.

It is therefore a principal object of the invention to provide an improved device for heating diesel fuel in a fuel tank.

A further object of the invention is to provide a device for heating diesel fuel in a fuel tank wherein the device may be quickly and easily installed in the tank and may be mounted on the filler neck of the conventional fuel tank.

Yet another object of the invention is to provide a system for heating diesel fuel in a fuel tank which may be either connected to the water manifold of the truck engine or to the truck electrical system.

Still another object of the invention is to provide a device for heating diesel fuel in a fuel tank which may be mounted therein without modification of the fuel tank.

These and other objects will be apparent to those skilled in the art.

SUMMARY OF THE INVENTION

The device of this invention is designed to heat the diesel fuel within a fuel tank to prevent the same from gelling during periods of cold temperatures. The device comprises a collar means having a tubular means extending downwardly therefrom and thence laterally therefrom. The device is installed in the fuel tank by removing the conventional fuel cap and inserting the device downwardly through the fill opening. The collar means of the device is then secured to the filler neck. A cap is then mounted on the upper end of the collar means. The fuel in the tank may either by heated by passing hot water through the tubular means or by installing an electrical heating element in the tubular means.

DESCRIPTION OF THE PREFERRED EMBODIMENT

Figure 1:
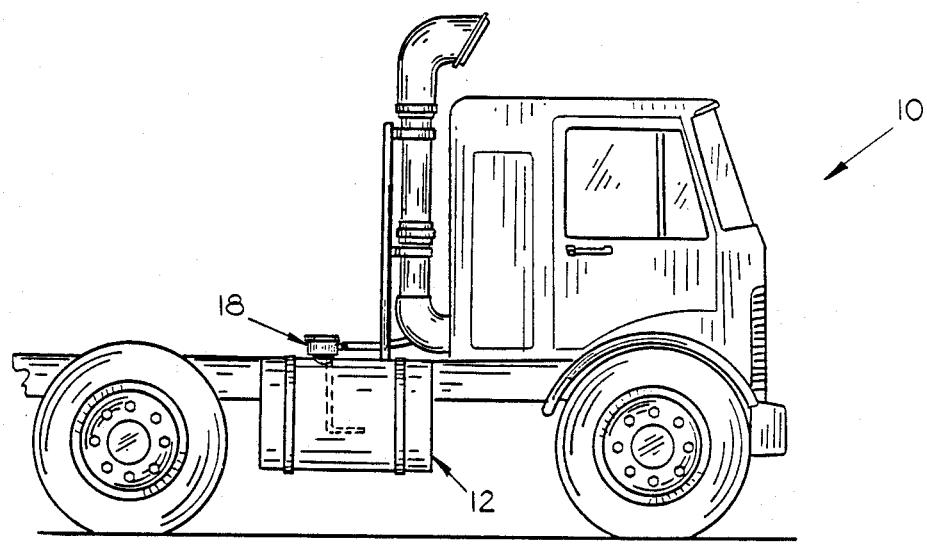
FIG. 1 is a side view of a truck having the system of this invention mounted in the fuel tank thereof.

In FIG. 1, the numeral 10 refers generally to a conventional truck having a fuel tank 12. Tank 12 is normally approximately 22 to 28 inches deep and includes an externally threaded filler neck 14 at its upper end defining a fill opening 16. In some of the recent designs, filler neck 14 is not threaded but has other means provided thereon to facilitate the attachment or installation of the conventional fuel cap.

Figure 2:
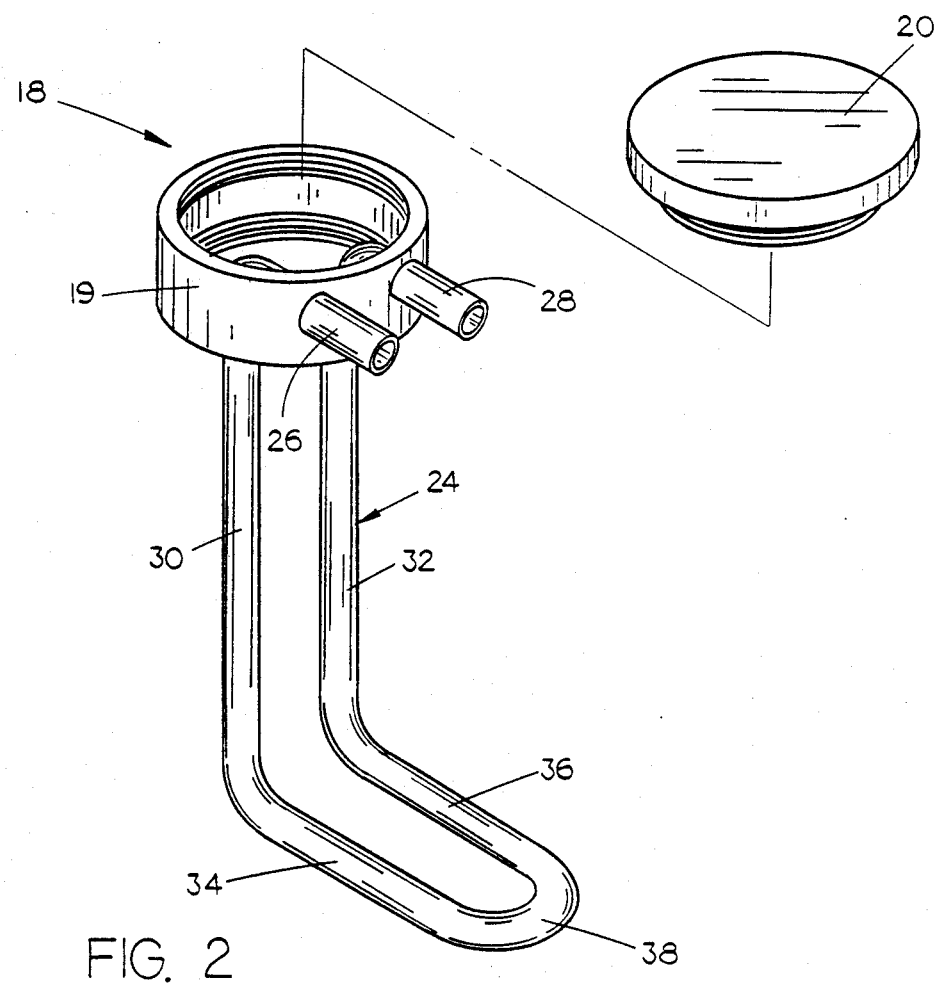
FIG. 2 is a perspective view of the device of this invention.
Figure 3:
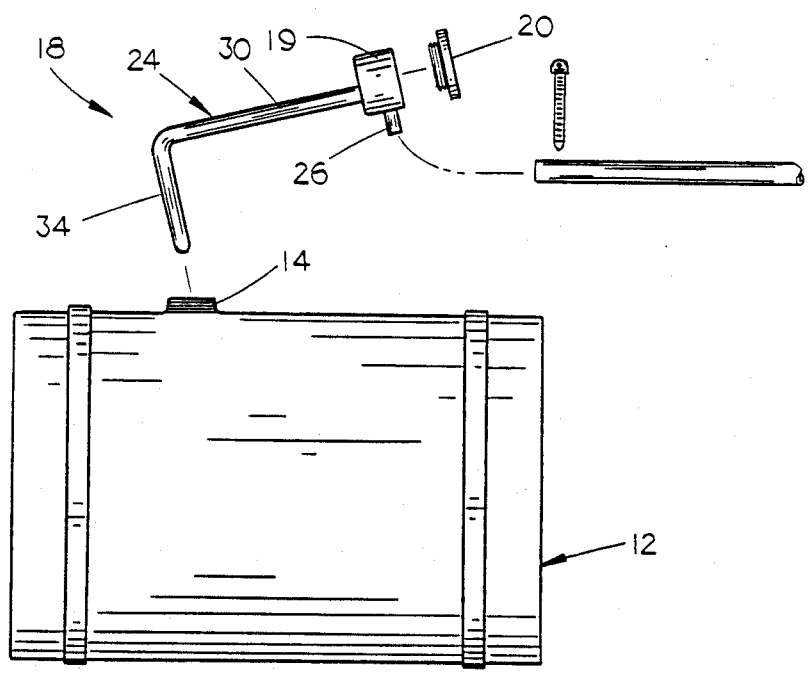
FIG. 3 is a side view illustrating the manner in which the heating element is installed into the fuel tank.
Figure 4:
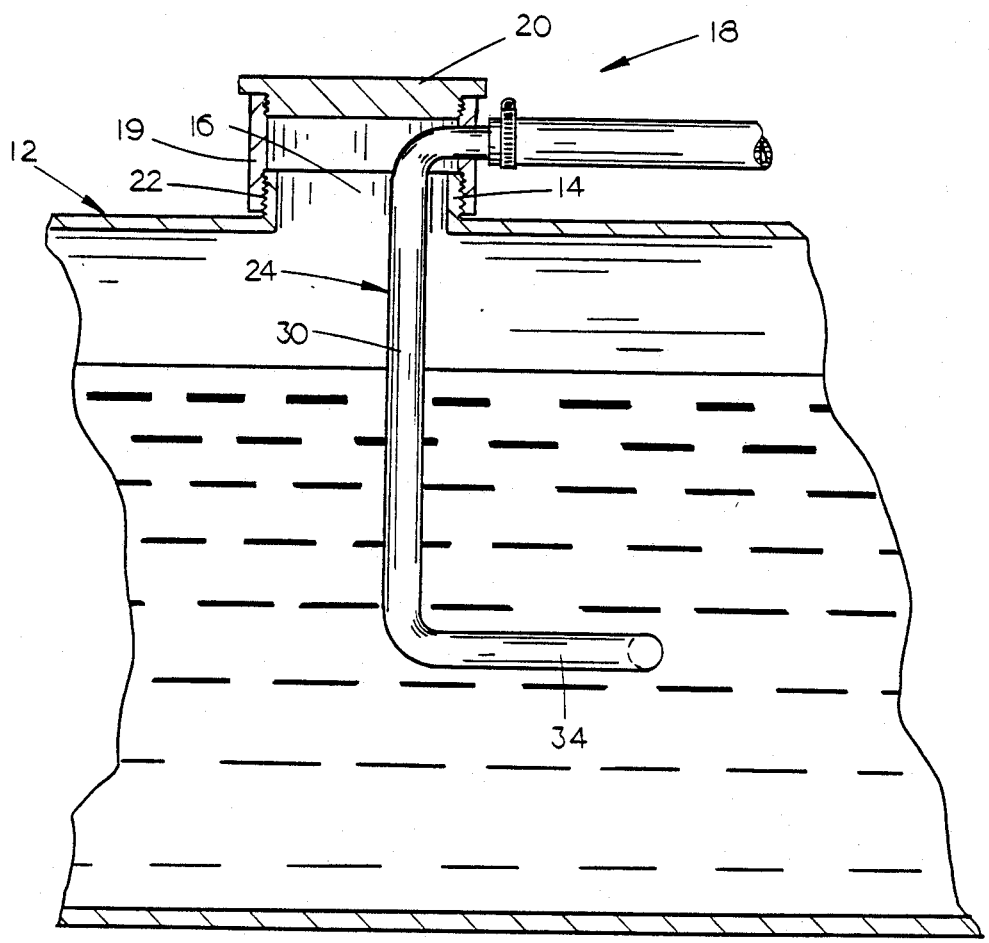
FIG. 4 is a sectional view illustrating the device of this invention mounted in the fuel tank.
Figure 5:
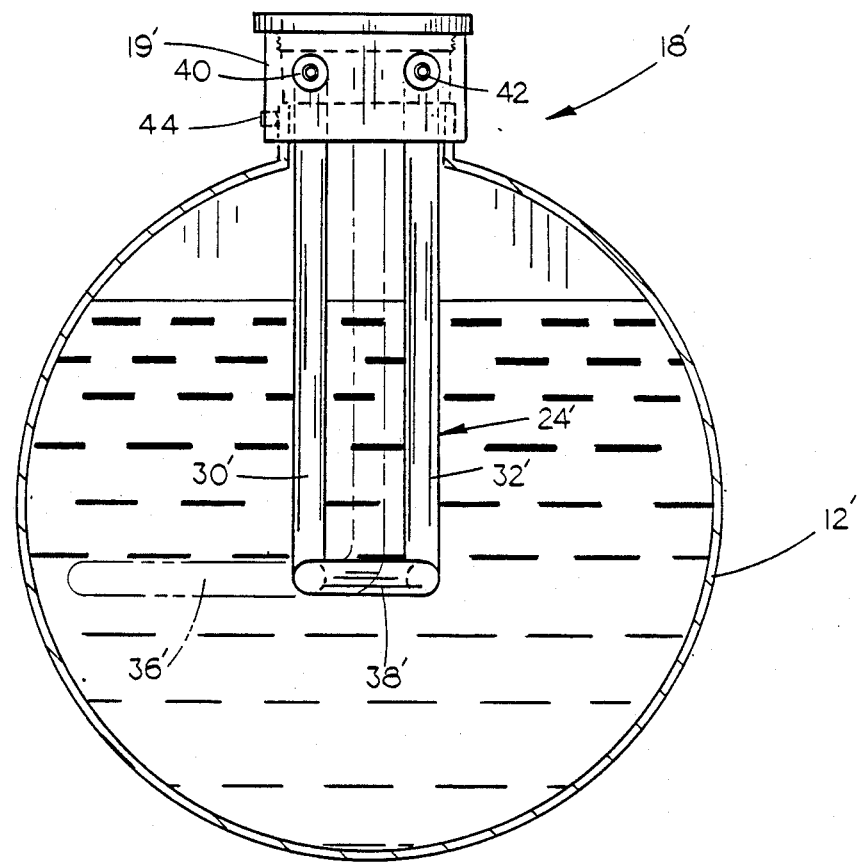
FIG. 5 is a sectional view similar to FIG. 4 except taken at right angles thereto.

The device of this invention is referred to generally by the reference numeral 18 and includes an adapter collar 19 which is adapted to be threadably mounted on filler neck 14. Cap means 20 having internal threads 22 provided thereon is adapted to be threadably secured to the adapter collar 19 as illustrated in FIGS. 2 and 3. A tubular means 24 is mounted in the adapter collar 19 and extends downwardly therefrom. Tubular means 24 comprises a pair of tubular portions 26 and 28 which extend outwardly through the collar 19 as illustrated in the drawings. Tubular portions 30 and 32 extend downwardly from the inner ends of tubular portions 26 and 28 and have tubular portions 34 and 36 extending laterally therefrom which are connected by a connecting tubular portion 38. Preferably, tubular portions 30 and 32 are approximately 20 inches long with the tubular portions 34 and 36 being approximately 12 inches long. It is recommended that tubular portions 30 and 32 and tubular portions 34 and 36 be spaced close enough together to pass through a three-inch fill opening in a tank. The method of installing the device in the tank is illustrated in FIG. 3. Device 18 is tilted or tipped so that the tubular portions 34 and 36 may be inserted downwardly through the fill opening 16. Once tubular portions 34 and 36 have been positioned within the tank, the device is rotated so that collar 19 may be threadably secured to filler neck 14. Cap 20 may then be installed as desired. As illustrated in FIGS. 1, 3 and 4, the tubular portions 26 and 28 may be secured to hoses which are fluidly connected to the water manifold on the truck engine so that hot water may be passed through the tubular means 24 to heat the fuel within the tank.

Figure 6:
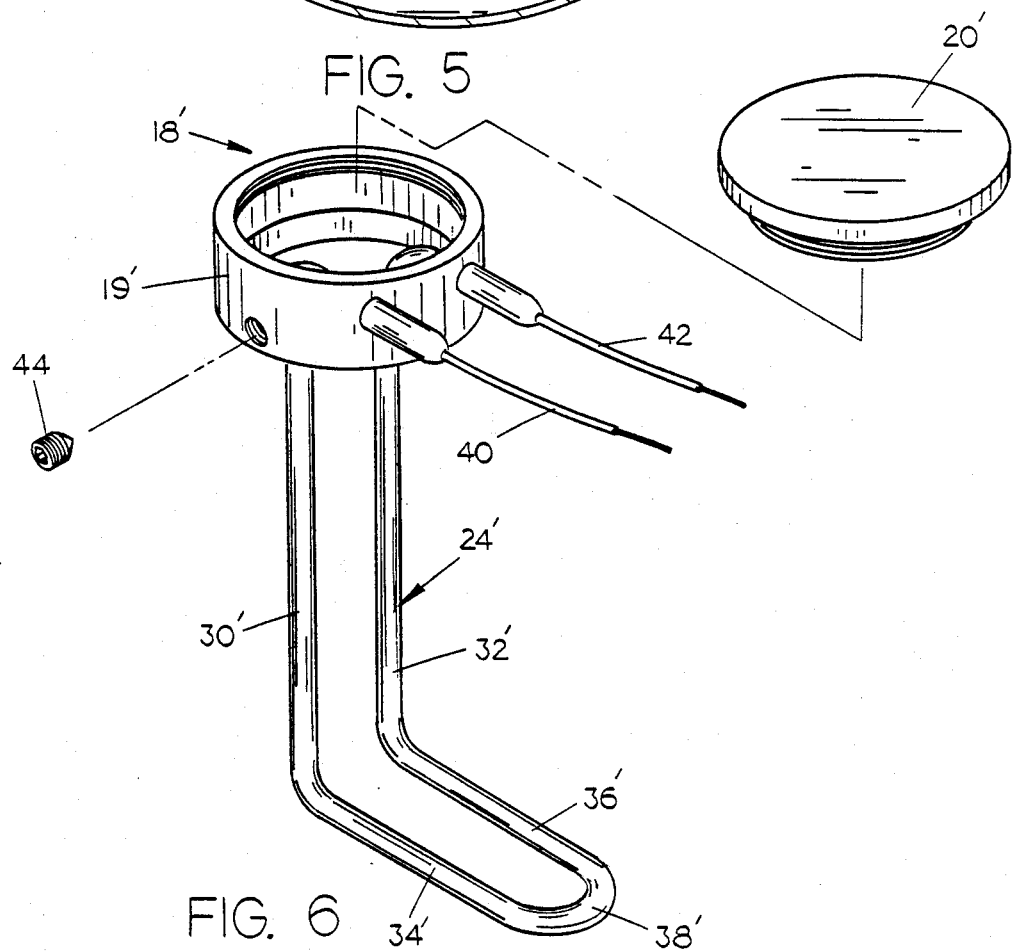
FIG. 6 is a perspective view of a modified form of the invention.

FIG. 6 illustrates a modified form of the invention referred to generally by the reference numeral 18' wherein the fuel in the tank is not heated by hot water passing through the tubular means but is heated by an electrical resistance element positioned in the tubular means. The resistance element within the tubular means 24' is connected to the truck electrical system by a pair of leads 40 and 42. In the embodiment of FIG. 6, the adapter collar 19' is secured to the filler neck by set screws 44.

Figure 7:
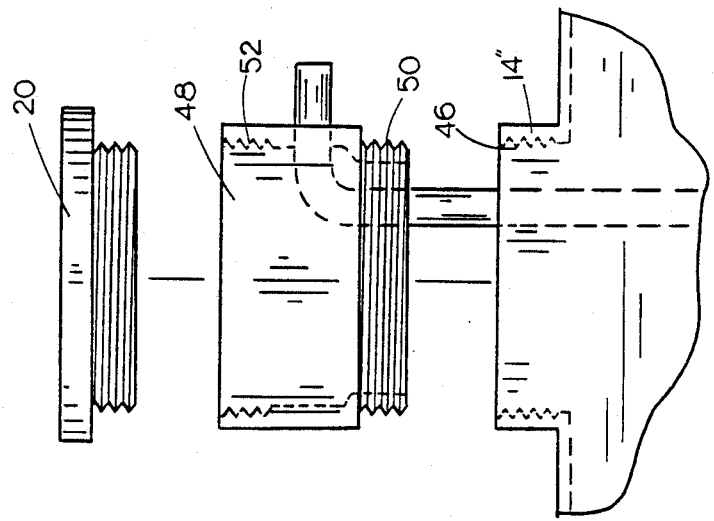
FIG. 7 is an exploded side elevational view of a further modified form of the invention.

A further embodiment is illustrated in FIG. 7 wherein the filler neck 14" includes internal threads 46. Adapter collar 48 includes external threads 50 at the lower end thereof which are adapted to be threadably received by the threads 46 on filler neck 14". The upper end of adapter collar 48 is provided with internal threads 52 adapted to receive the threads of the cap 20.

Figure 9:
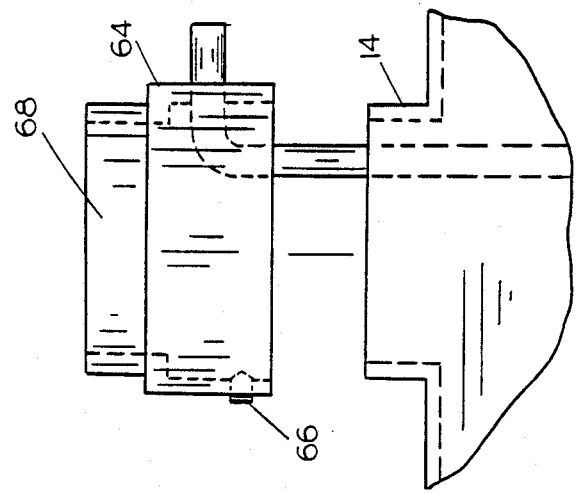
FIG. 9 is an exploded side elevational view of yet another modified form of the invention.
Figure 8:
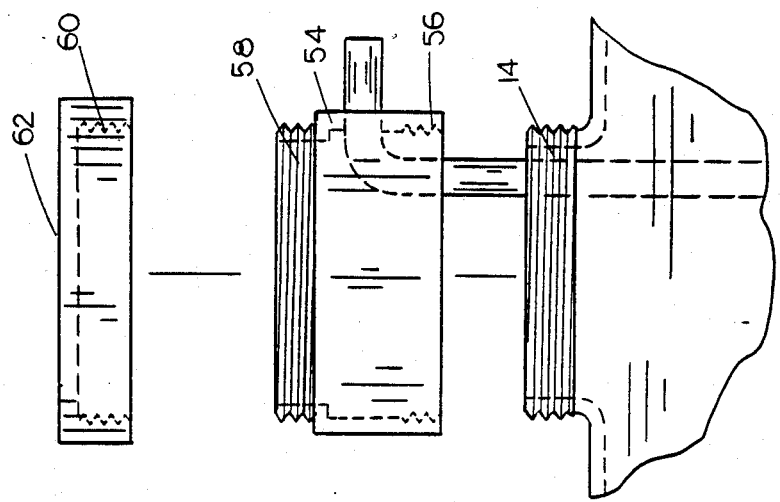
FIG. 8 is an exploded side elevational view of yet another modified form of the invention.

In FIG. 8, yet another embodiment is shown wherein the adapter collar 54 includes internal threads 56 at its lower end which are adapted to be received by the threads on the filler neck 14. Adapter collar 54 includes external threads 58 at its upper ends adapted to receive the internal threads 60 of the cap 62. In the embodiment illustrated in FIG. 9, the filler neck 14 does not have any threads and the adapter collar 64 is simply positioned thereon and held in place by means of the set screw 66. Cap 68 is secured to collar 64 by any convenient means such as by threads or the like.

It can therefore be seen that a novel device has been provided for heating the diesel fuel in a tank to prevent the same from gelling. The apparatus of this invention may be mounted on a conventional fuel tank without the necessity of cutting an access opening in the tank inasmuch as the device may be quickly and easily mounted on the filler neck of the fuel tank of the fuel tank. It can therefore be seen that the device accomplishes at least all of its stated objectives.

I claim:

1. A system for heating diesel fuel in a fuel tank mounted on a truck, said fuel tank including a conventional fill opening formed in the upper end thereof defined by a filler neck, comprising,
   a collar means,
   a tubular means extending downwardly from said collar means into the fuel tank, said tubular means having upper and lower ends,
   said collar means adapted to be removably mounted on the filler neck for selectively positioning said tubular means within the fuel tank, said collar means having an opening therethrough for permitting the filling of said fuel tank,
   means connected to the upper end of said tubular means for heating said tubular means whereby the diesel fuel in the fuel tank will be heated,
   and cap means selectively closing the opening through said collar means.

2. The system of claim 1 wherein said tubular means is connected to the water manifold of the truck.

3. The system of claim 1 wherein an electric heating element is provided in said tubular means, said heating element being operatively connected to the electrical system of the truck.

4. The system of claim 1 wherein said collar means is threadably mounted on said filler neck.

5. The system of claim 1 wherein said tubular means comprises a tubular member having a first tubular portion extending downwardly from said collar means, a second tubular portion extending laterally from the lower end of said first tubular portion, a third tubular portion spaced from said second tubular portion and positioned parallel thereto, a connecting tubular portion connecting said second and third tubular portions and a fourth tubular portion extending upwardly from said third tubular portion to said collar means, said fourth tubular portion being spaced from said first tubular portion.

6. The system of claim 5 wherein the configuration of said tubular means is such that said tubular means may be inserted through said fill opening.

7. The system of claim 5 wherein the configuation of said tubular means is such that said tubular means may be inserted through said fill opening and thence rotated with the fuel tank, within said collar means, to enable said collar means to be rotatably secured to said filler neck.

* * * * *